United States Patent [19]
Glasser

[11] 3,832,520
[45] Aug. 27, 1974

[54] WELDING HOOK
[75] Inventor: Fred A. Glasser, Fort Lauderdale, Fla.
[73] Assignee: Behring Corporation, Fort Lauderdale, Fla.
[22] Filed: May 25, 1973
[21] Appl. No.: 363,812

Related U.S. Application Data
[63] Continuation of Ser. No. 239,525, March 30, 1972, abandoned, which is a continuation-in-part of Ser. No. 164,251, July 20, 1971, abandoned.

[52] U.S. Cl.............. 219/130, 219/74, 219/136, 219/138
[51] Int. Cl........................ B23k 9/28, B23k 9/00
[58] Field of Search............ 219/130, 136, 138–144, 219/74, 75

[56] References Cited
UNITED STATES PATENTS

| | | | |
|---|---|---|---|
| 1,620,220 | 3/1927 | Morton | 219/138 |
| 2,555,017 | 5/1951 | Tuthill | 219/75 |
| 3,596,049 | 7/1971 | Ogden | 219/130 |
| 3,659,076 | 4/1972 | Ogden | 219/130 |

*Primary Examiner*—J. V. Truhe
*Assistant Examiner*—Hugh D. Jaeger
*Attorney, Agent, or Firm*—Oltman and Flynn

[57] ABSTRACT

A welding hook for use with a welding tool such as a gun or torch having a tip through which welding wire is supplied, the hook including an electrically conductive tube having an elongated shank which merges into a hook portion at one end of the tube that curves back toward but short of the other end of the tube. A liner extends through the tube, and the wire is fed through the tube. The tube and the wire are in electrical contact with each other at the hook end of the tube. A tip is provided at the hook end of the tube, and the other end of the tube is secured to the tip of the welding gun, so that wire and current are supplied from the welding tool through the tube to effect the weld with the wire. Inert gas may also be supplied through the tube for shielding. A fiberscope may be mounted on the welding hook to make the work visible.

10 Claims, 13 Drawing Figures

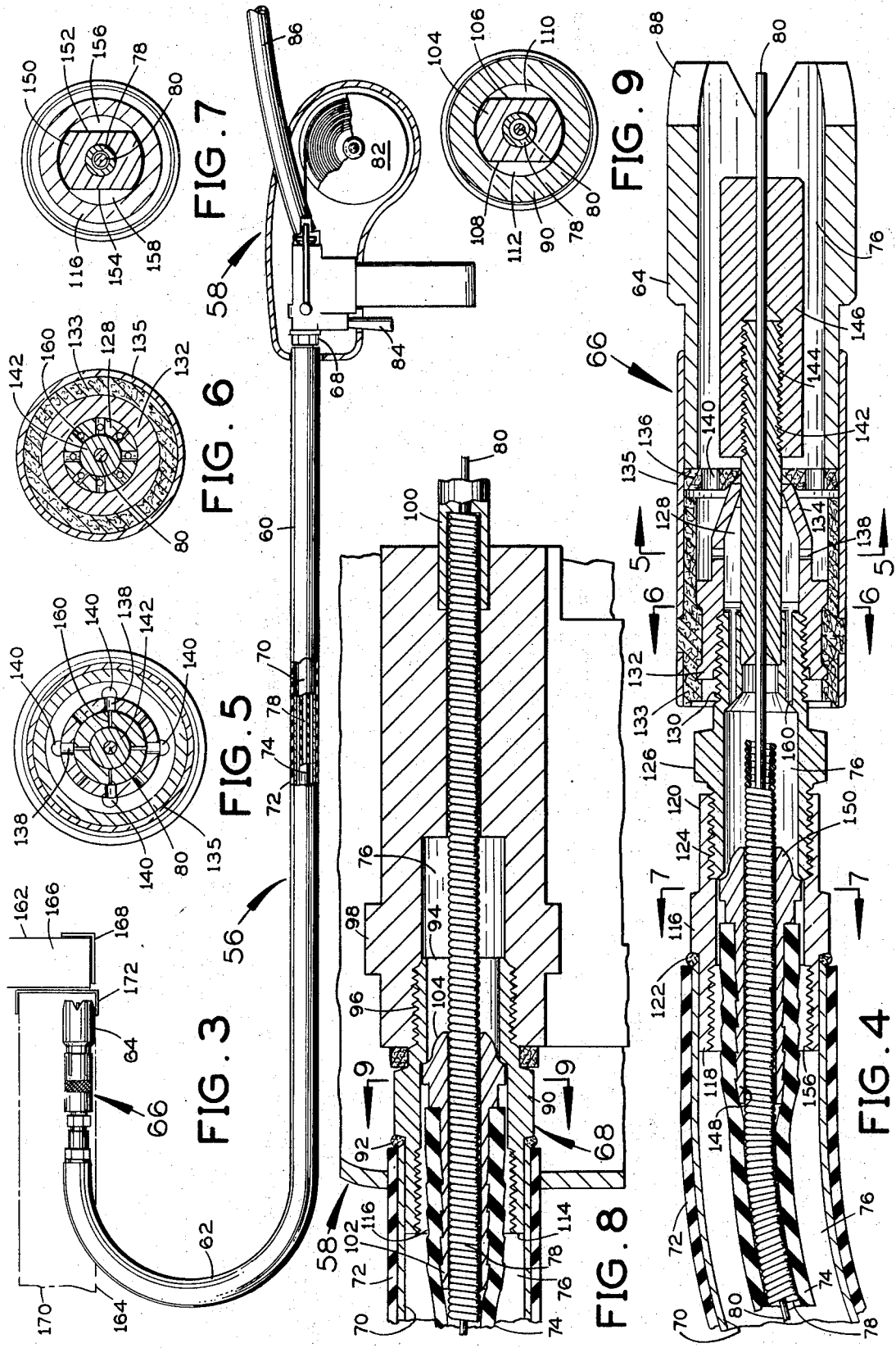

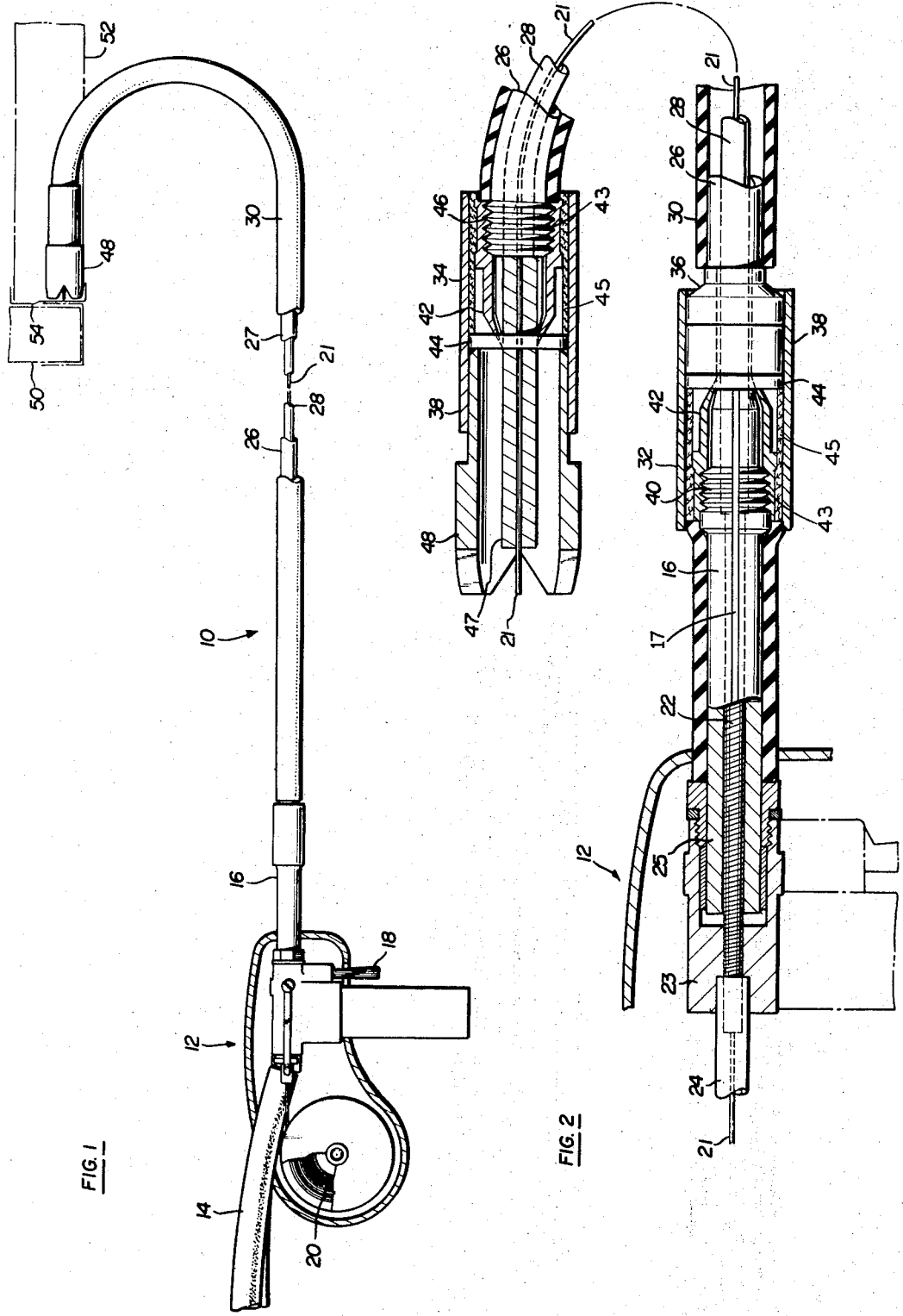

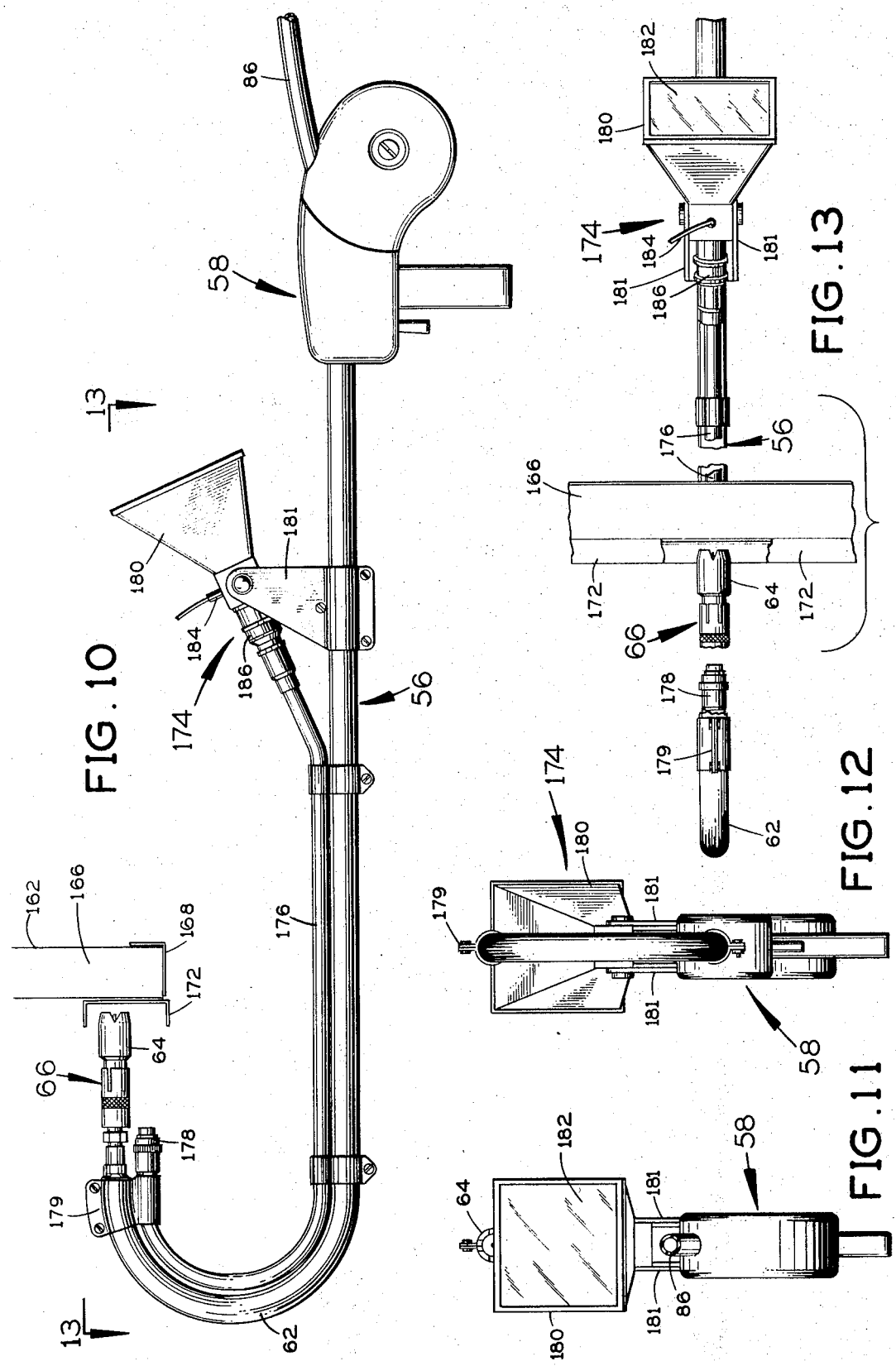

WELDING HOOK

RELATED APPLICATIONS

This application is a continuation of co-pending appliction Ser. No. 239,525, filed Mar. 30, 1972, now abandoned, which was a continuation-in-part of application Ser. No. 164,251, filed July 20, 1971, now abandoned, both by the present inventor and assigned to the present assignee.

BACKGROUND OF THE INVENTION

The invention relates to welding apparatus, and in particular to a welding hook attachment for a welding tool which enables the user to make a weld on the back side of any object. Sometimes it is necessary to make a weld at a place which is relatively inaccessible. A particular situation where this occurs is in the construction of modular buildings. In one type of modular building, wall frames are assembled with floor frames and roof frames, and all of the frames are welded together. Where the wall frame and floor frame are assembled, the weld is made on the back side of the wall frame where it adjoins a beam of the floor frame. There has been no practical way for a welder to get underneath the floor frame and reach up to the point where the weld is to be made. Also, there is some risk from noxious fumes if the welder gets too close to the work.

SUMMARY OF THE INVENTION

The invention provides a welding hook which is attached to a conventional welding tool such as a gun or torch so that the user may reach under the floor frame with the hook and place the tip of the hook on the back side of the wall frame where the weld is to be made. Other applications for the welding hook are possible.

The welding hook consists of an electrically conductive tube having an elongated shank portion merging into a hook portion. The hook portion curves back toward the end of the shank portion which is attached to the welding gun, but terminates short of that end. A high resistance liner is spaced inside the tube, and the welding wire is fed from the gun through the liner, and thus passes inside the conductive tube. Electrical current and inert gas are fed through the conductive tube, and the current is transferred to the welding wire at the tip end of the hook. Coupling means may be provided to secure one end of the shank to the welding gun. A second coupling element may be provided at the tip end of the hook, and a shielding tip is secured to this latter coupling means. An additional conductive tube may be used, but it is not essential. A fiberscope may be mounted on the welding hook.

Accordingly, it is an object of the present invention to provide a welding hook attachment for a welding tool with which welds may be made at relatively inaccessible places.

Another object of the invention is to provide a welding hook attachment for a welding gun or torch to enable a user to make a weld at the back side of a wall frame and floor frame assembly.

A further object of the invention is to provide a welding attachment which effectively extends a welding gun or torch and through which current and welding wire may be supplied to the back side of an object where a weld is to be made.

Another object of the invention is to provide a welding attachment with a fiberscope for making a remote weld area visible.

A further object of the invention is to provide a welding attachment which is relatively safe, economical, rugged and effective in making commercially acceptable welds.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is an elevational view, partly cut away, showing a welding hook attached to a welding tool in accordance with one embodiment of the invention;

FIG. 2 is a fragmentary sectional views, partly cut away showing the construction of the welding hook;

FIG. 3 is an elevational view, partly cut away, showing a welding hook attached to a welding tool in accordance with another embodiment of the invention;

FIG. 4 is a longitudinal sectional view of the tip end of the welding hook;

FIG. 5 is a cross sectional view taken along line 5—5 of FIG. 4 and looking in the direction of the arrows;

FIG. 6 is a cross sectional view taken along line 6—6 of FIG. 4 and looking in the direction of the arrows;

FIG. 7 is a cross sectional view taken along line 7—7 of FIG. 4 and looking in the direction of the arrows;

FIG. 8 is a longitudinal sectional view of the other end of the welding hook where it is attached to the welding gun;

FIG. 9 is a cross sectional view taken along line 9—9 of FIG. 8 and looking in the direction of the arrows;

FIG. 10 is an elevational view of the welding hook embodiment of FIG. 3 but with the addition of a fiberscope mounted on the welding hook;

FIG. 11 is a rear view of the welding gun showing a viewer of the fiberscope;

FIG. 12 is a front elevational view of the welding hook where the welding hook curves around behind the members being welded; and FIG. 13 is a top plan view, partly cut away, taken along line 13—13 of FIG. 10.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

The welding hook 10 is attached to a welding gun 12 which is a commercially available gun of conventional construction. The gun 12 is of metal-inert gas type. Torches or other welding tools are suitable. Inert gas is supplied to the gun through a hose 14 and the gas comes out of the tip 16 of the gun under the control of a trigger 18. A reel 20 of welding wire is provided inside the gun, and this wire is also supplied through the tip 16 under the control of the trigger 18.

Referring to FIG. 2, it may be seen that the welding gun has a steel spring liner 22 extending through the tip 16, and the wire 21 from the reel 20 passes through this spring liner. The liner has high electrical resistance. Attached to one end of the liner is a conductive member 24. Electrical current is supplied to the member 24 and is transferred to tip 16 of the welding gun through the conductive path 23, 25. Thus, in the use of the gun without a welding hook attachment, electrical potential is applied to the wire 21 at the tip of the gun by the use of a contact element (not shown).

The welding hook of the invention effectively extends the gun. A steel spring liner 22 is provided for the gun which is considerably longer than normal, and the spring liner 22 extends entirely through the hook 10. However, electrical current bypasses the spring liner inside the hook so as to avoid overheating of the steel spring liner. This is accomplished by providing an electrically conductive tube 26, preferably of copper, in the welding hook through which the current and gas can flow. The liner 22 could be of a high resistance material such as plastic if desired.

The tube 26 has a long, straight shank portion, the left end of which is attached to the welding gun 12. The other end of the shank portion merges into a hook portion 27 which curves around and back toward the welding gun, but terminates well short of the welding gun. As previously mentioned, the line 22 extends entirely through the tube 26.

There may be a second electrically conductive tube 28 spaced inside the tube 26 and directly surrounding the liner 22, but this second tube is not essential. The tube 28 could even be made of insulating material, or it can be omitted. The outside of the tube 26 is covered with insulating material such as rubber 30.

In the embodiment illustrated in FIGS. 1 and 2, two coupling elements 32 and 34 are provided. The coupling elements 32 and 34 are identical. The tube 26 has a reducer element 36 attached thereto which may be made of copper. The reducer element may be silver soldered to the tube 26. Where a second tube 28 is provided, this tube is also silver soldered to the reducer element on the inside thereof. The coupling element 32 is essentially a tube which has spring fingers at 38 that slip on the reducer element 36. The left end of the coupling element 32 is internally threaded on the inside thereof to screw onto threads 40 on the tip 16 of the welding gun. Inside the coupling element 32, there is a hollow tubuler projection 42 which serves as a connection to tube 28 and a stop for an insulating spatter guard 44. This projection 42 has an internally threaded base 43 which screws onto the threads 40 and is insulated from the tube portion of coupling element 32 by insulating material 46. Projection 42 is in electrical contact with the inner end of tube 28. Gas flows through a slot 17 in tip 16 and through openings in projection 42 and spatter guard 44 into the space between tubes 26 and 28. The spatter guard 44 is essentially a disk with holes in it through which gas can flow, and the guard serves to prevent welding splash from spattering back into the hook. However, it should be noted that this occurs only when the coupling element is used at the tip end of the hook as in the coupling element 34.

As previously mentioned, the coupling member 34 is identical to element 32, so as the same reference numerals are used for like parts. It may be noted that the tip end of the tube 26 is threaded so that the threads on the inside of the coupling element 34 can screw onto the threads 46. The fingers 38 of the coupling element 34 receive a shielding tip 48 which is essentially a hollow tube of copper through which the wire 21 extends. A contact tip 47 fits in projection 42 and receives the wire with a sliding fit. The projection 42 makes contact with the contact tip 47 and also with the tip end of the tube 28, so current flowing through the tube 26 is transferred to the wire 21. The inert gas flows through the space between tubes 26 and 28. This gas passes through the openings in the spatter guards 44 and exits thrugh the welding tip 48 to completely surround the tip of the wire 21 with inert gas while a weld is being made.

The tubes 26 and 28 provide a low resistance path for current to flow through the hook. Little or no current will flow through the spring wire liner; almost all or all of the current is transferred to the tubes 26 and 28 at the shank end of the hook. The current flows through tube 26 and also tube 28, where the latter tube is used. Then the current is transferred to the contact tip 47 and from there to the welding wire 21 at the far end of the hook. If the current were to flow entirely through the spring wire liner throughout the length of the hook, overheating of the liner would occur, and burning and rupturing of the liner could result.

In the use of the welding hook attachment, the operator manipulates the welding gun 12, and the hook 10 extends forward from the gun. The hook 10 is placed under a wall frame 50 to reach around to the back side of the wall frame as shown in FIG. 1. At the back side of the wall frame, there is a floor frame 52, and the two frames butt together at 54. The weld is made where the two frames butt together at 54. Thus, the shield 48 is pressed against the floor frame where it butts against the wall frame at 54. The operator presses the trigger 18 to feed wire 20 through the welding hook, and also to supply gas and current through the welding hook. An arc occurs where the tip of the wire 21 meets the weld area, and the frames are welded together at this point. The gas shields the weld. In this case, spot welds are made, but other types of welds could be made.

FIGS. 3 through 9 illustrate an embodiment of the invention which is very similar to the embodiment of FIGS. 1 and 2. The welding hook 56 is attached to a welding gun or tool 58, it being understood that the tool 58 may be either a gun or a torch as desired. As in the case of FIG. 1, the welding hook 56 has a straight shank portion 60 which is attached at its right end to the gun 58 and which merges at its left end with a hook portion 62 that curves back parallel with the shank portion but terminates short of the gun 58. The welding hook has a tip 64 which is attached to the hook end portion 62 by coupling means 66. The right end of the welding hook 56 as viewed in FIG. 3 has coupling means 68 coupling it to the gun 58. The coupling means 66 and tip 64 are shown particularly in FIG. 4, and the coupling means 68 is shown particularly in FIG. 8.

The welding hook 56 includes a conductive tube 70, which may be made of copper, providing the main current path for supplying current from the gun 58 to the wire at the tip 64. The tube 70 extends over substantially the full length of the welding hook 56. Tube 70 is covered with insulating material 72 which may be rubber.

Spaced concentrically inside tube 70, there is another tube 74 which in this embodiment is made of insulating material such as rubber. Inert gas flows through the welding hook in the space 76 between tubes 70 and 74. Tube 74 can be omitted.

A high resistance liner 78 is retained inside tube 70 concentrically within tube 74. The liner 78 may be made of any suitable high resistance material, but a steel spring wire is preferred. Tube 76 and liner 78 also extend over substantially the full length of the welding hook 56, and liner 78 extends into the gun 58 as shown in FIG. 8.

The welding wire 80 is fed from a spool 82 in the gun 58 under the control of a trigger 84. The welding wire 80 passes through the liner 78 and emerges from the welding hook at the tip 64. The tip 64 forms a shield for the wire 80 to insure that the wire is surrounded by inert gas at the point where the weld is made. The inert gas is supplied to the gun 58 through a suitable hose connection 86 and passes through a passage such as the slot 17 which is not shown in FIG. 3 through 9. The passage communicates with the space 76 which extends all the way through the welding hook. Thus, the gas flows through the gun and the welding hook to emerge from slots 88 which are recessed from the far end of the tip 64.

The coupling means 68 is shown particularly in FIGS. 8 and 9. There is a female coupling tube 90 which is silver soldered at 92 to the right end of the tub 70 as viewed in FIG. 8. The right end 94 of coupling tube 90 has exterior threads 96 which screw into interior threads in the tip 98 of the gun 58. Electrical current is delivered to a contact member 100 and flows from there through tip 98 and coupling element 96 to the tube 70 of the welding hook. The current flows through tube 70 to the other end of the welding hook where it eventually reaches the wire 80 as will be explained.

Gas flows through a passage (not shown) in the tip 98 to the space 76 which extends all the way through the welding hook as will be further explained. The tube 74 is attached around a nipple 102 which has a head 104 with flattened sides 106 and 108 which provides spaces at 110 and 112 which are really parts of the space 76 through which the gas flows. The greatest outside diameter of the head 104 fits snugly within the coupling tube 90, but the nipple 102 and the tube 74 on the outside of the nipple are spaced inside the left end 114 of the coupling tube 90 to provide space at 116 for gas to flow through the coupling tube 90. This latter space is also an extension or part of the space 76. The liner 78 and the wire 80 both extend through nipple 102, tip 98 and contact element 100.

The coupling means 66 is shown in FIGS. 4, 5, 6 and 7. It includes a coupling tube 116 which is very similar to the coupling tube 90 except that it has internal threads at both its left end 118 and its right end 120. The left end 118 of tube 116 fits inside tube 70 and is silver soldered to it at 122. The right end 120 of tube 116 has internal threads 124 which receive external threads of a male coupling tube 126. The male coupling tube 126 has at its right end as viewed in FIG. 4 a hollow projection 128 which has split fingers affixed to a tubular base 130 having external threads. The threads at 130 receive still another tubular member 132 known as a collet retainer. Retainer 132 fits tightly with insulating material 133 inside a metal tube 135 which has fingers releasably receiving tip 64. The tubular collet retainer 132 narrows down at its right end 134 to form a stop for the spatter guard 136 which is substantially identical to the spatter guard 44 of FIG. 2. Tubular collet retainer 132 has holes at 138, projection 128 has spaces between its fingers, and spatter guard 136 has holes at 140, all to allow gas to flow through the coupling means.

A contact tip 142 has a sliding fit inside the fingers of projection 128 and passes through the right end 134 of retainer 132 and also passes through the spatter guard 136. The contact tip 142 has threads 144 which receive a graphite tip 146 that helps to protect the metal contact tip 142 from burning. Contact tip 142 may be made of copper. Both copper tip 142 and graphite tip 146 make electrical contact with the wire 80 by means of a sliding fit between the wire and the tips. Both the tip 142 and the tip 146 are spaced inside the shielding tip 64 to allow space 76 for flow of gas.

Coupling tube 116, coupling tube 126, tubular projection 128, tubular collet retainer 132, tip 142 and tip 146 are all made of electrically conductive material, and all except tip 146 may be made of metal. Thus, these members provide a continuous conductive path from the tube 70 to the wire 80 within tips 142 and 146.

A nipple 148 receives the end of tube 74, and there is space at 150 forming an extension of space 76 for gas to flow through the tube 116. The nipple 148 has a head 150 which, as shown in FIG. 7 has flat sides at 152 and 154 providing spaces 156 and 158 for flow of gas through the coupling means 66. There is also space 76 inside tubular coupling member 126. Gas can flow through passages 160, between the spaces between fingers 128, through openings 138 and 140 and the space 76 within shielding tip 64 to emerge through the recesses 88. Thus, gas surrounds the wire 80 at the tip of the welding hook.

Referring again to FIG. 3, it may be seen that the welding hook 56 may be utilized to reach behind work to make a weld at a relatively inaccessible place. The work illustrated in FIG. 3 consists of a wall frame 162 and a floor frame 164 of a building such as a modular house. The wall frame includes vertical metal studs 166 received in a still 168 in the form of an angle member. The floor frame consists of metal joists 170 received in a metal perimeter beam 172 in the form of a channel member. The tip 64 reaches around behind the perimeter beam 172 and may be pressed against that perimeter beam to weld the perimeter beam to the studs 166. More than one weld is ordinarily made between the perimeter beam and the studs, and these welds are spot welds.

In FIGS. 10 through 13, there is shown a fiberscope 174 mounted on the welding hook 56 to make the area of the perimeter beam 172 where a weld is to be made visible. The fiberscope 174 consists of a fiber optics bundle 176 having essentially the same configuration as the welding hook 56. The tips lens end 178 is approximately under the coupling means 66 and the viewer 180 is on top of the shank at the right end of the hook. The fiber optics bundle and lens can be placed on the opposite side of the hook to avoid weld splash, if desired. The viewer 180 has a screen or face plate 182 where the image can be viewed. The fiberscope contains an integral lighting system. Light is introduced at the light source 184 and travels through the fiber bundle 176 to the lens 178. Lens 178 is mounted by means of a bracket 179 and viewer 180 is mounted by means of a bracket 181. There may be lenses in the head 186.

Such fiber optic assemblies are known as fiberscopes and are available commercially. It is to be noted, however, that the provision of a fiberscope on the welding hook is not essential. It is possible for a worker to line up the tip 64 with the area where the weld is to be made and then duck back out of the way while a weld is being made.

Thus, with the welding hook attachment of the invention, it is possible to make welds at relatively inaccessible places. The welding hook can be readily manipulated to reach such places, and so it does not detract from the portability of the welding gun. The weld can be shielded with insert gas. The hook can be made flexible. The welding hook is rugged and can be applied economically on a mass production line.

Having thus described my invention, I claim:

1. A welding hook for use with a welding tool through which welding wire, current and inert gas are supplied, said welding hook comprising
   a rigid J-shaped tube of electrically conductive metal having an elongated shank portion merging into a hook portion at one end of said tube which curves back toward but short of the other end of said tube,
   a high resistance liner retained inside said tube through which the wire is fed,
   means providing electrical contact between said tube and said wire at the tip end of the hook,
   insulating material covering said tube, and
   coupling means on said other end of said tube for securing the same to said welding tool so that welding wire and current are supplied from said tool through said tube to effect a weld with said wire.

2. The welding hook as claimed in claim 1 in which said tube and said liner are spaced radially from each other providing a passage for flow of gas from said tool through said hook to shield the weld.

3. The welding hook as claimed in claim 1 including a second coupling means affixed to the tip end of said tube, and a tubular shield affixed to said second coupling means.

4. The welding hook as claimed in claim 3 including a contact tip fitting in said second coupling means and together with said second coupling means establishing electrical contact from said tube to said wire.

5. The welding hook as claimed in claim 4 in which said second coupling means comprises a conductive tubular member having an internal sleeve receiving and engaging said contact tip.

6. The welding hook as claimed in claim 5 in which said second coupling means has a splatter guard extending transversely therein for blocking weld splash.

7. The welding hook as claimed in claim 1 in which said liner comprises a steel spring sleeve.

8. The welding hook as claimed in claim 1 in which said liner comprises an insulating sleeve.

9. A welding hook in an arc welding apparatus having a wire feeding means and means for supplying electrical current and inert gas to the welding hook, said welding hook comprising;
   a rigid, J-shaped tube of high electrical conductivity metal for passing the wire and the inert gas along its length, said tube having an elongated straight shank portion merging into a hook portion at one end which curves through a turn of substantially 180° back toward but short of the other end of said tube by at least half the length of said straight shank portion;
   an annular contact tip of high electrical conductivity metal disposed axially beyond said one end of the tube and slidably receiving and directly engaging the wire beyond said one end of the tube to pass current to the wire thereat;
   one or more annular projection members of high electrical conductivity metal projecting axially beyond said one end of the tube and joining the latter to said contact tip to pass current from the tube to said contact tip;
   a coupling sleeve extending circumferentially around and insulated from said one or more projection members and said contact tip;
   means at said one end of the tube for passing the inert gas from inside the tube into said sleeve around said contact tip beyond said one end of the tube;
   and an annular shield removably attached to said coupling sleeve and projecting axially therefrom beyond said contact tip to hold gas around the end of the wire beyond said contact tip, said shield having apertures at its end away from the tube for the escape of the inert gas thereat.

10. A welding hook according to claim 16, wherein said coupling sleeve receives said shield, and further comprising an insulation spatter guard extending transversely across the interior of said coupling sleeve and located axially between the inner end of said shield and the adjacent end of said one or more projection members, said splatter guard being perforated to pass inert gas into the shield around said contact tip and the wire.

* * * * *